United States Patent [19]
LeMay

[11] 3,727,183

[45] Apr. 10, 1973

[54] PATTERN RECOGNITION DEVICE INCLUDING MEANS FOR COMPENSATING FOR REGISTRATION ERRORS

[75] Inventor: Christopher Archibald Gordon LeMay, Osterley, England

[73] Assignee: EMI Limited, Hayes, Middlesex, England

[22] Filed: May 11, 1971

[21] Appl. No.: 142,378

Related U.S. Application Data

[63] Continuation of Ser. No. 753,282, Aug. 16, 1968, abandoned.

[30] Foreign Application Priority Data

Aug. 16, 1967 Great Britain ....................37,657/67

[52] U.S. Cl. ......................340/146.3 H, 340/146.3 Q

[51] Int. Cl. ..............................................G06k 9/04

[58] Field of Search ....................340/146.3; 178/6.8; 250/220

[56] References Cited

UNITED STATES PATENTS 3,292,149 12/1966 Bourne .........................340/146.3 E 3,432,674 3/1969 Hobrough ...........................250/220

3,534,167 10/1970 O'Brien ................................178/6.8

OTHER PUBLICATIONS

Smeltzer, IBM Tech. Disclosure Bulletin, "Character Recognition by Automatic Comparison," Vol. 7, No. 10, March, 1965, P. 937.

*Primary Examiner*—Maynard R. Wilbur
*Assistant Examiner*—Leo H. Boudreau
*Attorney*—Fleit, Gipple & Jacobson

[57] ABSTRACT

A pattern recognition device according to the invention comprises means for scanning an input pattern to derive a representation thereof, means for comparing the representation with each representation of a plurality of known patterns to identify the known pattern most similar to the input pattern and means for deriving an error signal representing a registration error between the input pattern and the known pattern most similar thereto. Means are then provided for utilizing the error signals to produce successive modifications of the scanning waveforms of the scanning means in dependence upon the error signals to tend to reduce the error signal.

9 Claims, 7 Drawing Figures

A PATTERN RECOGNITION DEVICE INCLUDING MEANS FOR COMPENSATING FOR REGISTRATION ERRORS

This application is a continuation of my application Ser. No. 753,282, filed Aug. 16, 1968 and now abandoned.

The present invention relates a pattern recognition device including means for compensating for registration errors and especially but not exclusively to such a device that is capable of recognising figures and alphabetic characters.

For the input of information into a computer for example, it is desirable to be able to recognise hand written figures and letters, but as the characters are written by hand there is inevitably a certain indeterminancy as to the position, size and attitude of the characters, and these variations render reliable recognition of the characters by an automatic machine very difficult to achieve.

It is an object of the present invention to provide an improved pattern recognition device including means for compensating for registration errors in the pattern to be recognised, such as errors in position, size or attitude.

A pattern recognition device including:

a. means for scanning an input pattern to be recognized to derive therefrom a representation of said input pattern, b. means for generating scanning waveforms for said scanning means, c. storage means conditioned to store representations of a plurality of known patterns, d. means adapted to compare said representation of said input pattern with each of said representations of known patterns to select a known pattern according to a selection criterion, e. means responsive to said representation of said input pattern and the representation of said selected known pattern, f. means adapted to modify the scanning waveforms for said scanning means in a sense tending to reduce said error signal, and g. means adapted to control the operation of the device so as to cause the scanning operation effected under the control of the modified scanning waveforms to be followed by further operations of the comparing means, and of the error signal deriving means until a degree of correspondence between the representation of the input pattern and the last selected known pattern is obtained which is greater than a threshold value.

Figure 1:
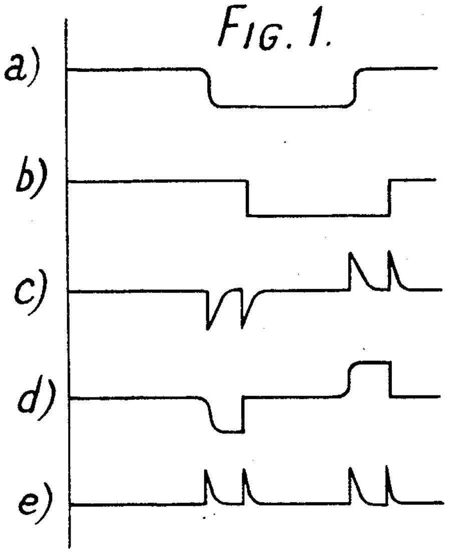
Figure 2:
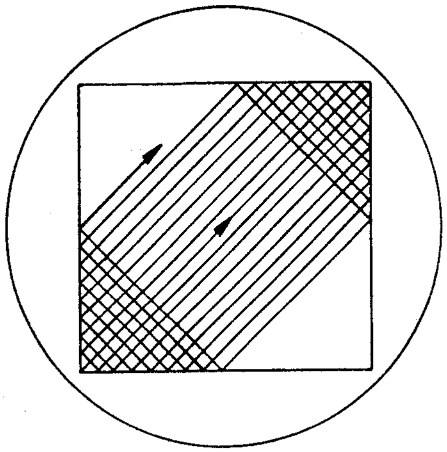
Figure 5:
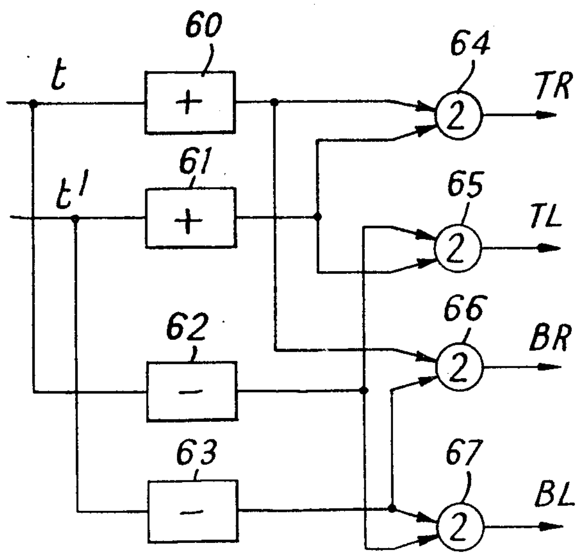
Figure 3:
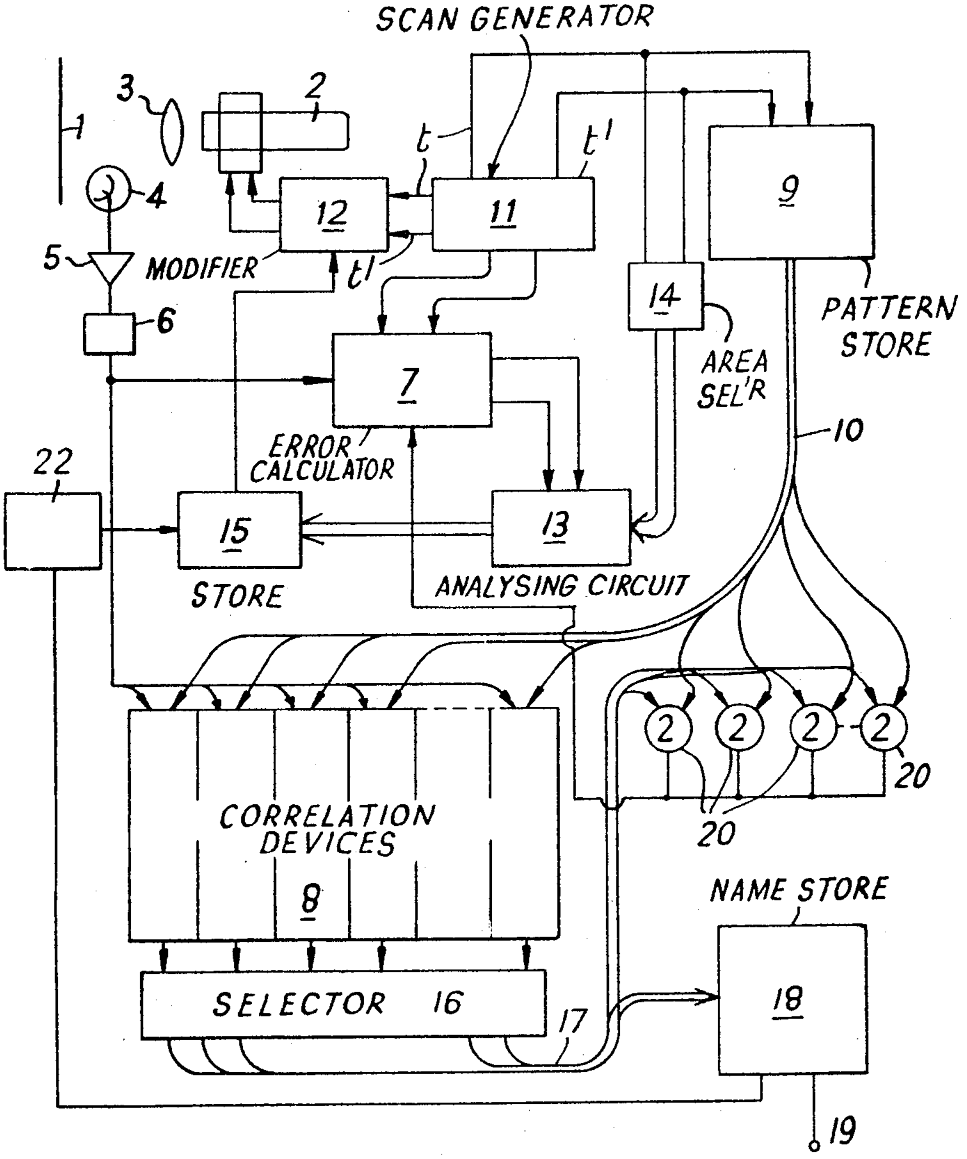
Figure 4:
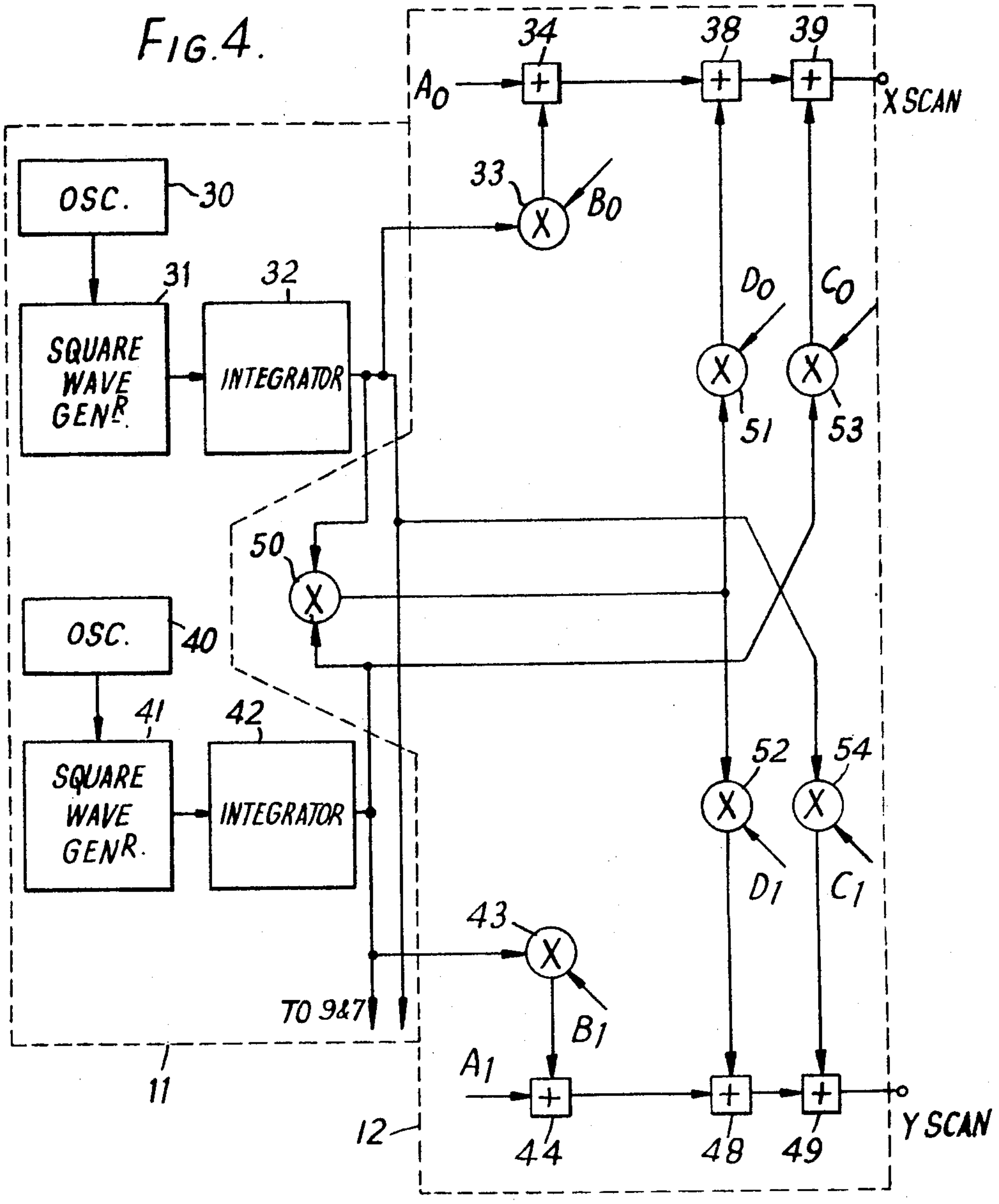
Figure 6A:
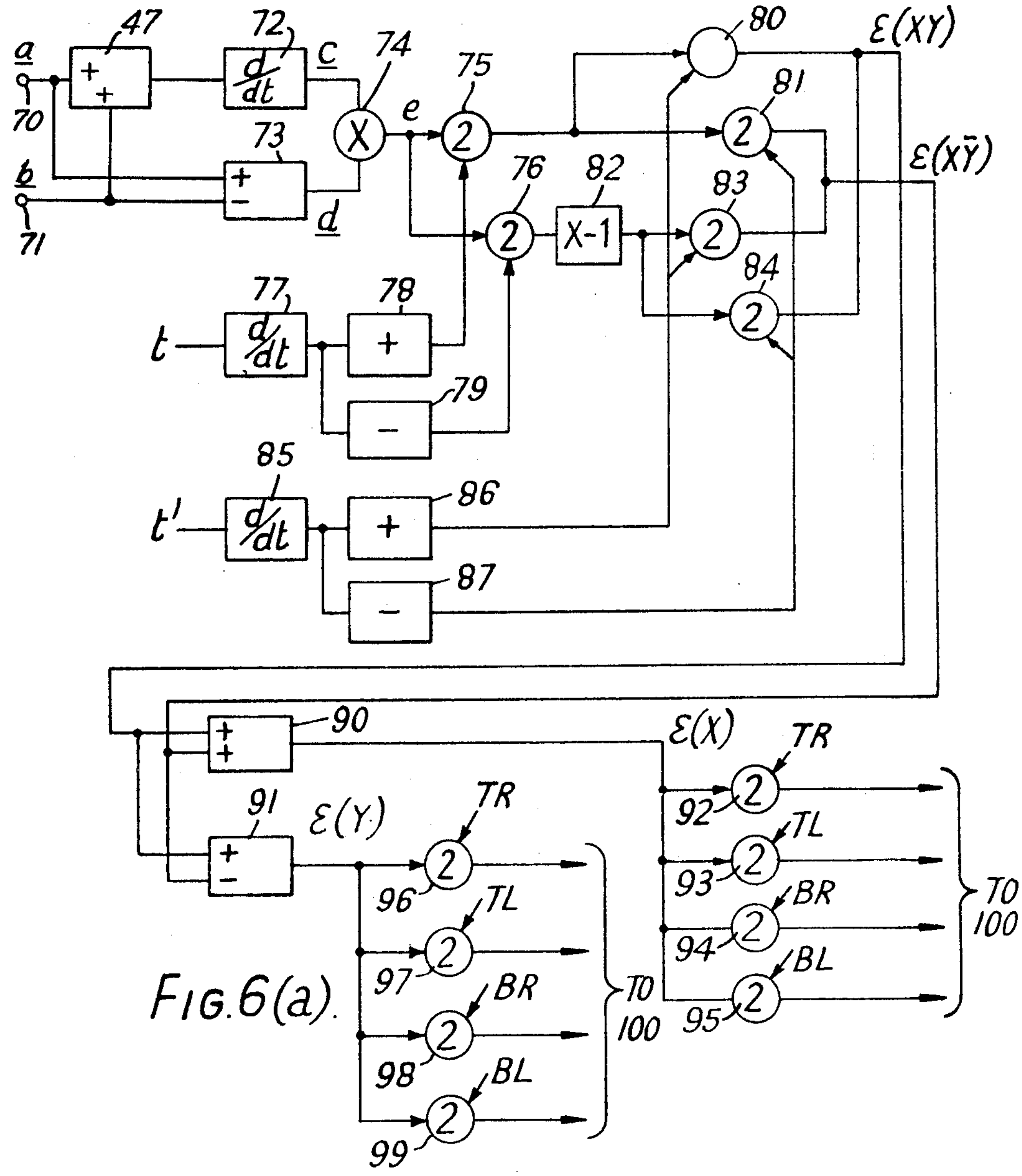
Figure 6B:
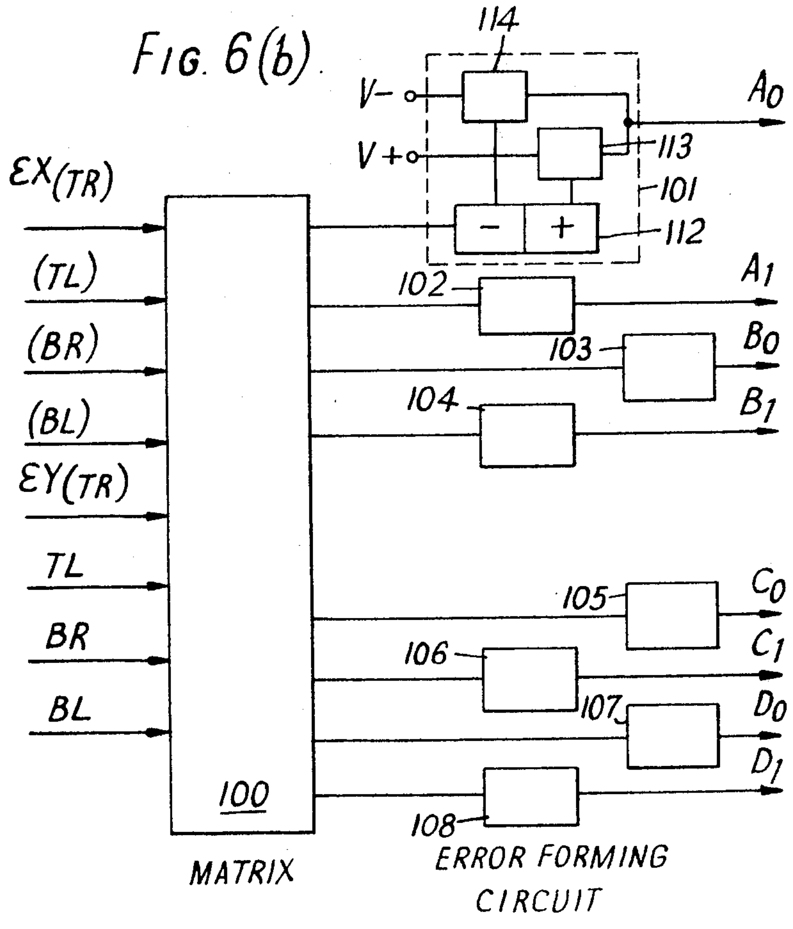

In order that the invention may be fully understood and readily carried into effect it will now be described with reference to the accompanying drawings, of which:

FIG. 1 is a diagram showing waveforms which will be used to explain the operation of a pattern recognition device according to one example of the invention, FIG. 2 is a diagram of the scanning raster employed in said device, FIG. 3 is a block diagram showing the general layout of the pattern recognition device to which FIGS. 1 and 2 relate, FIG. 4 illustrates in greater detail the scanning waveform generator and modifier of the device illustrated in FIG. 3, FIG. 5 illustrates a quadrant selector embodied in the apparatus illustrated in FIG. 3, and FIGS. 6(*a*) and 6(*b*) illustrate the circuit for processing the errors in the device in FIG. 3.

In FIG. 1 the waveform *a* is a representation of an element of an unknown pattern, which waveform may be produced for example by scanning a line of the pattern by means of a pick-up tube or a flying spot scanner. The waveform *b* is that of the corresponding element of a pattern which is the same as the unknown pattern but derived from a store in a pattern recognition device. The waveform *c* is the sum of the derivatives of the waveforms *a* and *b*. The waveform *d* is the difference between the waveforms *a* and *b*. The waveform *e* forms the elementary mis-registration error signal between the waveforms *a* and *b* and is the product of the waveforms *c* and *d*.

As the waveform *a* precedes the waveform *b* the polarity of the waveform *e* is positive whereas had the waveform *b* preceded the waveform *a* the polarity of the waveform *e* would be negative. Thus the polarity of the elementary mis-registration error signal *e* indicates the sense of the positional error of the waveform *a* relative to the waveform *b* and in accordance with the present invention is used to modify the scanning waveform of the scanning means from which said waveform *a* was derived from the unknown pattern so that the waveforms *a* and *b* are aligned.

Errors will also be produced for other registration errors affecting the unknown pattern, such as error in size or parallelism and, as will appear, the invention allows errors of different kinds to be detected and accommodated, by processing the elementary mis-registration error signals in a variety of different ways. It will be appreciated from FIG. 1 that the pulses which constitute the elementary error signals may be either positive or negative, and they may occur at different positions in the scanning raster, so that it is possible to process in different ways errors arising from different areas of the field which is scanned for the purpose of identifying the unknown pattern on the field. For example, if FIG. 1 were drawn for the case of waveform *b* overlapping waveform *a* at both ends, indicating an error of size in the pattern to which the waveform *a* relates, the elementary error signal *e* would consist of two pulses of negative polarity followed by two pulses of positive polarity.

As the misalignment of the unknown pattern can include both horizontal and vertical components it is desirable that the scan of the unknown pattern should include lines which cut the pattern in both horizontal and vertical directions. The conventional television raster is not suitable for this application because although the raster does in fact cover an area it is made up solely from horizontal lines so that vertical misalignment of the pattern is much more difficult to sense and to correct. So as to overcome this difficulty the method of scanning shown in FIG. 2 is adopted in the example of the invention about to be described. The pattern is scanned by both rising and falling diagonal lines. This scan is easily produced by means of two triangular waveform generators, one for the X co-ordinate deflection and one for the Y co-ordinate deflection, the two triangular waveforms having slightly different frequencies.

With the scanning raster shown in FIG. 2, the spot crosses the pattern in directions of increasing and decreasing values of the two co-ordinates. There may therefore be ambiguity in the polarity of the elementary mis-registration error signals $e$. This ambiguity can however be resolved by taking account of the sense of the scanning waveforms. Let the sum of elementary error signals derived, subject to sign correction, in a complete scan of the unknown pattern be called the error signal $\epsilon$. Also, let the error signal $\epsilon$ derived when the spot is moving so that both the X and Y co-ordinates are varying in the same sense be called $\epsilon(XY)$; Similarly, let the error signal $\epsilon$ derived when the $X$ and $Y$ co-ordinates are varying in different senses be called $\epsilon(X\overline{Y})$. The $X$ component of the error signal $\epsilon$ can then be derived as follows:

$$\epsilon(X)=\epsilon(X\overline{Y})+\epsilon(XY)$$

By a similar definition the $Y$ component of the error signal is as follows:

$$\epsilon(Y)=-\epsilon(X\overline{Y})+\epsilon(XY).$$

Now, let the $X$ error signals from the four quadrants of the field be denoted as $\epsilon(X)_{TR}$, $\epsilon(X)_{TL}$, $\epsilon(X)_{BR}$ and $\epsilon(X)_{BL}$, where $TR$, $TL$, $BR$ and $BL$ denote respectively the top right, top left, bottom right and bottom left quadrants of the field. A similar notation is adopted for the quadrantal components of the $Y$ error $\epsilon(Y)$. Using this notation, error signals for different positional and shape errors can then be derived as follows:

The error signal for displacement parallel to the $X$ axis is:

$$\epsilon(X)_{TR}+\epsilon(X)_{TL}+\epsilon(X)_{BR}+\epsilon(X)_{BL}=A_O$$

and for displacement parallel to the $Y$ axis is:

$$\epsilon(Y)_{TR}+\epsilon(Y)_{TL}+\epsilon(Y)_{BR}+\epsilon(Y)_{BL}=A_1$$

The error signal for the horizontal component of size is $$\epsilon(X)_{TR}+\epsilon(X)_{BR}-\epsilon(X)_{TL}-\epsilon(X)_{BL}=B_O$$

The error signal for vertical component size is $$\epsilon(Y)_{TR}+\epsilon(Y)_{TL}-\epsilon(Y)_{BR}-\epsilon(Y)_{BL}=B_1$$

By using all four of these error signals the machine would be able to match an unknown pattern to a known pattern even if it were not the correct size as well as not being in the correct position.

If the pattern is distorted so that it leans over like italic scrip, an error signal to organise the correction can be provided:

$$\epsilon(X)_{TR}+\epsilon(X)_{TL}-\epsilon(X)_{BR}-\epsilon(X)_{BL}=C_O$$

If the pattern is distorted so that the right hand side is raised in relation to the left hand side, then the error signal for correction is $$\epsilon(Y)_{TR}+\epsilon(Y)_{BR}-\epsilon(Y)_{TL}-\epsilon(Y)_{BL}=C_1$$

From the point of view of stability, this system as so far described behaves like four independent servo loops. Although six error signals are generated, these are not independent and are all defined by the resultant motions of the portions of the image that lie in the four quadrants of the field.

One more important pair of corrections can be derived from the four quadrants of the field described. If the pattern is distorted so that the height on the right hand side is different from that on the left a correction may be applied by making the correction to the $Y$ scan waveform proportional to the $X$ deflection.

The error signal to control this is $$\epsilon(Y)_{TL}-\epsilon(Y)_{BL}-\epsilon(Y)_{TR}+\epsilon(Y)_{BR}=D_1$$

If the top is not the same size as the bottom, the error signal required is $$\epsilon(X)_{TL}-\epsilon(X)_{TR}-\epsilon(X)_{BL}+\epsilon(X)_{BR}=D_O$$

Another error signal which may be required is that necessary to correct for distortion due to difference in size of the parts of the pattern on the left and right hand halves of the field in the horizontal direction and in the upper and lower halves of the field in the vertical direction. That is to say distortion arising from non-linearity of scale in the $X$ and $Y$ co-ordinate directions, and such error signals can be derived if the device is such that the field is divided into more than four areas, such as nine or 16, by subtracting the error signal used to derive the horizontal component of the size error on the right hand side of the field from that derived from the left half, to give the required $X$ scan correction and by subtracting the error signal used to derive the vertical component of the size error in the upper part of the field from that error signal derived from the bottom to give the required Y scan correction.

In the device illustrated in FIGS. 3 to 6, different error signals are derived corresponding to the above, but as will appear, each error signal such as, $A_O$, $A_1$, $B_0$, $B_1$, $C_0$, $C_1$, $D_O$ and $D_1$ is quantised to have one of three values, the first representing a positive error, the second (zero) representing no error, and the third representing a negative error.

Referring now to FIGS. 3 to 6, it will be assumed that the unknown pattern to be recognised is presented to the device on a sheet 1 in a position where it can be scanned by the flying spot of the scanner 2, focused by a lens system 3. The light reflected by the sheet 1 is modulated by the pattern being scanned and it is detected by a photo-cell 4 to produce a video signal which is amplified by the amplifier 5 and then passed by way of a limiter 6 to the position error calculator 7. The limiter 6 limits the video signal from the amplifier 5 so that the video signal has only two levels, as indicated in the fragment of the video waveform shown by *a* in FIG. 1. The video signal from the limter 6 is also applied to a plurality of correlation devices 8, which respectively receive from a pattern store 9 individual video signals representing different stored patterns. The multiple leads from the pattern store 9 are represented by a single thickened line 10. In this example of the invention the pattern store 9 stores the known patterns as visual representations of the same kind as are applied to the flying spot scanner 2 and signals are reproduced from the store 9, as required, by one or more flying spot scanners similar to 2.

Basic scanning waveforms for the device are generated by a scan generator 11 which produces two symmetric sawtooth waveforms of slightly different frequencies to define a basic raster such as represented by FIG. 2. These two waveforms are denoted by the symbols $t$ and $t'$ where $t$ represents the horizontal ($X$) scanning waveform and $t'$ represents a vertical ($Y$)

scanning waveform. The two waveforms $t$ and $t'$ are applied to the pattern store 9 directly to control the flying spot scanner or scanners therein. They are also applied to the scanning coils of the flying spot scanner 2 but in this case by way of a scan modifier 12 which will be described in greater detail with reference to FIG. 4. In normal operation of the device, the waveform derived from the unknown pattern is compared with the waveforms derived from the pattern store 9 in every frame of the scan, and the position error calculator 7 is rendered operational after the first frame of the scan. The error signals $\epsilon X$ and $\epsilon Y$ are calculated with reference to a pattern selected from the store 9 in the immediately preceding frame. These error signals are processed by means of an analysing circuit 13 to produce the error signals $A_0$ to $D_1$ referred to above. In producing these error signals, the analysing circuit 13 also makes use of output signals from a quadrant area selector 14 the input of which is derived from the scan generator 11. The error signals $A_0$ to $D_1$ produced by the analysing circuit 13 are stored in store 15 which provides input signals for the scan modifier 12 during the next frame when a further comparison is made between the unknown pattern and the patterns in the store 9.

During correlating, device 8 produces output signals which represent the degree of correlation between the unknown pattern and the different patterns from the store 9. These correlation signals are fed to the highest total selector 16. This has a plurality of output leads denoted generally by the reference 17, one for each of the patterns in the store 9. The highest total selector energises the lead corresponding to the pattern giving the best correlation with the unknown pattern and this in turn causes a name store 18 to produce at the output terminal 19 a signal representing the name code corresponding to the selected stored pattern. The same energising signal opens one of the "two input AND" gates 20 for the next scanning frame so that the video signal from the store 9 corresponding to the selected pattern can be fed by way of the respective gate 20 to the position error calculator 7. The position error calculator is thus enabled during the next frame to generate the error signals $\epsilon X$ and $\epsilon Y$. If as a result of a modification of the scanning waveforms for the flying spot scanner 2 the correlation devices 8 change the pattern selected from the store 9, the output of the name store 18 will change accordingly. When this occurs, a change indicating signal is fed from the store 18 by way of the lead 21 to a changer 22 which operates as will be described later. Further increments to the error signals in the store are then based on the error detected in the following scans between the unknown pattern and the newly selected pattern from the store 9.

As shown in FIG. 4, the scan generator 11 comprises an oscillator 30 which generates a sinusoidal oscillation of the frequency required for the $X$ scan sawtooth waveform. The sine wave is changed to a square waveform by a square waveform generator 31 and the square wave is integrated in an integrator 32 to produce the symmetric sawtooth waveform $t$. It also comprises an oscillator 40 which generates a sinusoidal oscillation of the frequency required for the $Y$ scan waveform. This sinusoidal oscillation is converted to a square wave by the square wave generator 41 and the square wave is integrated in integrator 42 to produce the symmetric sawtooth waveform $t'$. These waveforms $t$ and $t'$ are applied, as already indicated, to the pattern store 9, the scan modifier 12 and the quadrant area selector 14. They are also applied to the error calculator 7.

The quadrant area selector 14 is illustrated in FIG. 5 and it comprises four threshold circuits 60, 61, 62 and 63. The $X$ scan waveform $t$ is applied to the threshold circuits 60 and 62 and the Y scan waveform is applied to the threshold circuits 61 and 63. The threshold circuits 60 and 61 are set up so that they produce an output only when the respective input signals are positive and the threshold circuits 62 and 63 produce an output only when the respective input signals are negative. The four outputs of the threshold circuits are applied in pairs to four "two input AND" gates 64 to 67 and as can be seen from an analysis of FIG. 5 these gates will produce output signals when the scan is respectively in the top right, top left, bottom right and bottom left quadrants of the field.

FIG. 6 (which is shown in two parts 6($a$) and 6($b$)) illustrates the construction of the position error calculator 7. The waveforms $a$ and $b$ (FIG. 1) derived respectively from the threshold circuit 6 and the pattern store 9 are applied to the terminals 70 and 71. The waveform $a$ at the terminal 70 is applied in parallel to an adding circuit 47 and a subtracting circuit 73. The waveform $b$ is applied from the terminal 71 in parallel to the other inputs of the adding circuit 47 and subtracting circuit 73, and the output of adding circuit 47 is applied to a differentiating circuit 72. The outputs of the circuits 72 and 73 are respectively the signals $c$ and $d$ of FIG. 1 and they are multiplied in a multiplying circuit 74 and the product $e$ is fed in parallel to a pair of "two input AND" gates 75 and 76. The second inputs for the gates 75 and 76 are derived from a sense discriminator which consists of a differentiating circuit 77 and two threshold circuits 78 and 79. The input to the differentiating circuit 77 is the $X$ scan waveform $t$ and the input to the threshold circuits 78 and 79 is the output of 77. The threshold circuits 78 and 79 produce output signals respectively when the derivative of $t$ is positive and negative. When thee derivative is positive, the gate 75 is opened to feed the output $e$ from 74 to "two input AND" gates 80 and 81. When the derivative of $t$ is negative, the gate 76 passes the output $e$ of the multiplier 74 to a phase inverting circuit 82 and thence to "two input AND" gates 83 and 84.

A second sense discriminator is provided for the Y scan waveform $t'$ and this consists of a differentiating circuit 85 and two threshold circuits 86 and 87. The latter produce respective outputs when the sense of the $Y$ scan is positive and negative and these outputs serve as enabling signals for the gates 80, 81, 83 and 84. The outputs of the gates 80 and 84 are combined to produce elementary contributions to the error signal $\epsilon(XY)$ and the outputs of the gates 81 and 83 are combined to produce elementary contributions to the error signal $\epsilon(X\overline{Y})$.

Each elementary contribution to the error signals $\epsilon(XY)$ and $\epsilon(X\overline{Y})$ is fed to an adding circuit 90 which produces an elementary contribution to the error signal $\epsilon X$ for each complete elementary scan in each direction of the raster shown in FIG. 2 and to a subtracting circuit 91 which produces a similar elementary contribution to the error signal $\epsilon Y$. To this end adding circuit 90 and subtracting circuit 91 must have integrating properties so that they integrate their resultants over a period equal to an elementary scan in each direction of the raster shown in FIG. 2. The contributions to the error signal $\epsilon X$ are applied in parallel to four 'two' gates 92 to 95, the second inputs of which are fed with the respective signals TR, TL, BR, and BL produced by the quadrant area selector 14 illustrated in FIG. 5. Similarly the contributions to the error signal $\epsilon Y$ from the subtracting circuit 91 are fed to four "two input AND" gates 96 to 99 the second inputs of which are fed respectively with the aforesaid quadrant signals. Thus there is obtained a series of elementary contributions to the eight quadrant error signals required for the formation of the error signals $A_0$, $A_1$ . . . D, and the signals are fed to a matrix 100 producing respective output trains of pulses, each pulse of which an represents elementary contribution to one or other of the aforesaid error signals $A_0$, $A_1$ . . . $D_1$. The construction of the matrix is merely not shown since it comprises a plurality of combining amplifiers, some of which are phase inverting, connected in such a way as to feed to respective outputs elementary contributions to the different error signals $A_0$, $A_1$ . . . $D_1$ in accordance with the equations set out above. The respective trains of pulses are fed to error forming circuits 101 to 108 which are all of similar construction. As shown in the case of the circuit 101, each error forming circuit comprises a reversible accumular 112 which develops a potential which is positive, negative or zero during an error calculating frame, depending on the relative number of positive and negative pulses which are fed to it from the matrix 100. If at the end of the field the potential which is developed is positive, the analogue gate 113 is opened to apply a fixed positive potential +V to the output terminal for the error signal $A_0$. If on the other hand, the accumulated signal in 112 is negative, and output is derived which opens the gate 114 and applies a fixed negative signal −V to the output terminal for the signal $A_0$. If the output of the accumulator 112 is zero or nearly so, neither of the gates 113 and 114 is opened and so the output signal $A_0$ is zero. Therefore each of the error signals $A_1$ to $D_1$ has at the end of each frame one of three values, +V, zero or −V and these signals are stored in the store 15 to form inputs to the scan modifier 12 for the next frame. The accumulators such as 112 are cleared at the end of each frame after the store 15 has received thee incremental signals $A_0$, $A_1$ . . . $D_1$.

The construction of the scan modifier 12 is shown on the right hand part of FIG. 4. It comprises a multiplier 33 to which is fed the $X$ scan waveform $t$ from the integrator 32. The multiplying signal to the multiplier 33 is error signal $B_0$ and so the output is $B_0t$. The modifier also includes a multiplier 43, which corresponds to 33 but operates on the $Y$ scan waveform $t'$ and the error signal $B_1$. The output of 43 is therefore $B_1t'$. A further multiplier 50 is provided which forms the product tt' and this product is fed to two further multipliers 51 and 52, the multiplying inputs to which are the signals $D_0$ and $D_1$ respectively. The output of 51 is therefore $D_0tt'$ and the output of 52 is $D_1tt'$. Two further multipliers 53 and 54 are included for forming respectively the products $C_0t'$ and $C_1t$. The outputs of the multipliers 33, 51 and 53 are added by means of adders 34, 38 and 39 to the error signal $A_0$ to produce the $X$ scan modifying signal. Similarly the outputs of the multipliers 43, 52 and 54 are added by adders 44, 48 and 49 to the error signal $A_1$ to produce the $Y$ scan modifying signal. Therefore in the next frame the $X$ scan waveform for the flying spot scanner 2 is represented by the waveform $t$ to which is added the function $$A_0 + B_0t + D_0t't + C_0t'$$

and the $Y$ scan waveform is represented by the waveform $t'$ to which is added the function $$A_1 + B_1t' + D_1tt' + C_1t$$

In these functions, the error signals are either zero or a fixed magnitude but of selected sign. A further comparison is then carried out, comparing the video signal produced by the modified scan with the patterns in the store 9, which are reproduced by the unmodified scan waveforms $t$ and $t'$. If no change occurs in the output of the name store 18, further position error calculation with respect to the same selected pattern takes place at the same time producing further increments to be added to the error signals $A_0$, $A_1$ . . . $D_1$. This incremental process of scan modification continues, assuming no change in the output of the store 18 until an output is obtained from the selector 16 indicating a degree of correlation with the selected pattern which is above a given threshold and is at least a predetermined amount greater than the next highest correlation. If at the end of a frame, the output in the name store 18 is changed, the changer 22 operates to prevent the incremental signals $A_0$, $A_1$ . . . $D_1$ produced during the frame in question by the error forming circuits 101 to 108 from being fed to the store 15.

The invention is especially applicable to the recognition of hand written block capitals but it may also be applied to other fields of pattern recognition, such as medical work where images may be of standard form differing in size and exact shape. Another application for the invention is in the automatic navigation of an aircraft by comparing an image of the ground with photographs. For some of these applications a flying spot scanner would not be suitable and some form of television camera or other scanning devices may be used instead.

The alignment of the unknown pattern with the known pattern as described above is best achieved by using low frequency components of the video signal from 5 and of the video signals from the pattern store 9. However it would be possible to arrange that higher order of terms may be taken into account in making a final check that the recognition is correct.

Although the device described operates mainly with analogue signals, many of the functions may be performed with digital signals. For example the scan generator 11 may be arranged to generate digital representations of the scanning waveform for application to a digital store for the known pattern signal representations. In this case the video signal from 5 would have to be quantised in digital form before application to the correlation networks 8. The position error calculator may also be in the form of a digital computer.

Other factors than those described may be taken into account in calculating the error signals such as $A_0$, $A_1$ . . . $D_1$. Moreover the error signals may be weighted according to the areas of the field from which they arise.

It may be desirable to store in the pattern store 9 more than one representation of each known pattern so that considerable departures from normal size and orientation may be accommodated. It may even be desirable to enable the system to recognise patterns at all angles, sometimes completely inverted. To achieve the effect of rotation through 90° to 180° of the patterns stored in the store 9 it is only necessary to interchange or invert the signals used to address the store 9. In this way four different orientations of the known patterns spaced at 90° intervals are obtained.

Amongst other modifications it may be desirable to divide the pattern area into more than four areas by means of the area selector 14 and in another example of the invention nine areas are used. The device according to the invention may also utilise adaptive techniques so that the patterns entered in the store 9 are derived by the device from known patterns.

The invention is also not limited to the method of forming elementary error signals which is described with reference to FIG. 1. A similar result can be obtained by forming the product of the video signal from the amplifier 5 and the selected stored pattern, forming a second product of the video signal and a delayed version of the stored pattern, and forming the difference of the two products.

I claim:

1. A pattern recognition device including:

a. means for scanning an input pattern to be recognized to derive therefrom a representation of said input pattern, b. means for generating scanning waveforms for said scanning means, c. storage means conditioned to store representations of a plurality of known patterns, d. means adapted to compare said representation of said input pattern with each of said representations of known patterns to select a known pattern according to a selection criterion, e. means responsive to said representation of said input pattern and the representation of said selected known pattern adapted to derive an error signal which is related to the extent of a registration error between the representation of said input pattern and the representation of said selected known pattern, f. means adapted to modify the scanning waveforms for said scanning means in a sense tending to reduce said error signal, and g. means adapted to control the operation of the device so as to cause the scanning operation effected under the control of the modified scanning waveforms to be followed by further operations of the comparing means, and of the error signal deriving means until a degree of correspondence between the representation of the input pattern and the last selected known pattern is obtained which is greater than a threshold value.

2. A device according to claim 1 in which said means for generating said scanning waveforms includes means for generating a raster of diagonal lines.

3. A device according to claim 1 wherein said means adapted to derive an error signal comprises means adapted to derive different error signals which are related to the extent of registration errors of different kinds between the representation of said input pattern and the representation of the selected known pattern, and said means adapted to modify comprises means for utilizing said different error signals to produce different modifications of said scanning waveforms.

4. A device according to claim 3 wherein said means adapted to derive different error signals includes:

a. means for defining different areas of the scanning field of said scanning means, b. means for producing signals which are related to the extent of the misregistration of the representations of said input and said selected known pattern in each of said different areas, and c. means for differently combining said signals which are related to the extent of the misregistration thereby to generate said different error signals.

5. A device according to claim 4 wherein said means for defining different areas includes means for utilizing said scanning waveforms to generate selected signals representing different areas of the scanning field, and said means for producing signals which are related to the extent of the misregistration includes means for utilizing said selecting signals.

6. A device according to claim 1 including means adapted to generate an error signal which is related to the extent of a shift of position.

7. A device according to claim 1 including means adapted to generate an error signal which is related to the extent of a difference of size.

8. A device according to claim 1 including means adapted to generate an error signal which is related to the extent of an error in parallelism.

9. A pattern recognition device including:

a. means for scanning an input pattern to be recognized to derive therefrom a representation of said input pattern, b. means for generating scanning waveforms for said scanning means, c. storage means conditioned to store representations of a plurality of known patterns, d. means adapted to compare said representation of said input pattern with each of said representations of known patterns to select a known pattern according to a selection criterion, e. means for defining different areas of the scanning field of said scanning means, f. means for producing signals which are related to the extent of the misregistration between the representation of said input pattern and the representation of said selected known pattern in each of said different areas, g. means for differently combining said signals which are related to the extent of the misregistration thereby to generate different error signals which are related to the extent of registration errors of different kinds between the representation of said input pattern and the representation of said selected known pattern, h. means adapted to modify the scanning waveforms for said scanning means in a sense tending to reduce said different error signals, and i. means adapted to control the operation of the device so as to cause the scanning operation effected under the control of the modified scanning waveforms to be followed by further operations of the comparing means and of the error signal deriving means until a degree of correspondence between the representations of the input pattern and the last selected known pattern is obtained which is greater than a threshold value.

* * * * *